July 6, 1948.   C. H. SMITH ET AL   2,444,619
ELECTRICAL TIMING DEVICE

Filed Aug. 30, 1945   2 Sheets-Sheet 1

Herman Lindau
Cecil Hill Smith
by
Peck & Peck
ATTORNEYS

July 6, 1948. C. H. SMITH ET AL 2,444,619
ELECTRICAL TIMING DEVICE
Filed Aug. 30, 1945 2 Sheets-Sheet 2

Patented July 6, 1948

2,444,619

UNITED STATES PATENT OFFICE 2,444,619

ELECTRICAL TIMING DEVICE

Cecil Hill Smith, London, and Herman Lindars, Sheffield, England; said Smith assignor to said Lindars Application August 30, 1945, Serial No. 613,656
In Great Britain September 14, 1944

12 Claims. (Cl. 175—320)

This invention relates to electrical timing devices and it refers more particularly to apparatus, hereinafter referred to as apparatus for "the purpose specified," which will receive primary electrical current impulses from a first electrical circuit which act to close a secondary electrical circuit including apparatus to be controlled, for a period of time which is a desired fraction of the duration of the primary impulses.

Such apparatus is required in the control of various operations and processes, and many types of apparatus have been designed for this purpose.

According to the present invention apparatus for the purpose specified comprises an electric eddy current motor of the watt-hour meter type having two current coils or magnets hereinafter called magnets which act on the movable element to urge it in opposite directions, means to cause energisation of one magnet when the primary current flows, means to cause energisation of the other magnet at predetermined intervals comprising time mechanism and contacts closed by the movable element of the motor under the action of the one magnet, means to cause de-energisation of said other magnet when the movable element of the motor has returned to a zero or starting position, and means to close a secondary electrical circuit during the period that the rotatable element of the motor is returning to the zero position, said other magnet causing the movable element to move at a faster rate than does the one magnet.

The means to cause energisation of the one magnet will be a first relay which is energised when the primary current flows and which controls contacts connected in the circuit of said one magnet. The time mechanism used in the means to cause energisation of the other magnet at predetermined intervals may be any convenient form of time mechanism such as an electric clock and the means to control energisation of said other magnet may be a second relay which controls contacts in the circuit of said other magnet and means to cause deenergisation of said second relay when the movable element of the motor has returned to a zero position.

One form of apparatus to close a secondary electrical circuit for a period which is a definite fraction of time during which a primary current flows will now be described by way of example and with reference to the accompanying drawings wherein—

Figure 1:
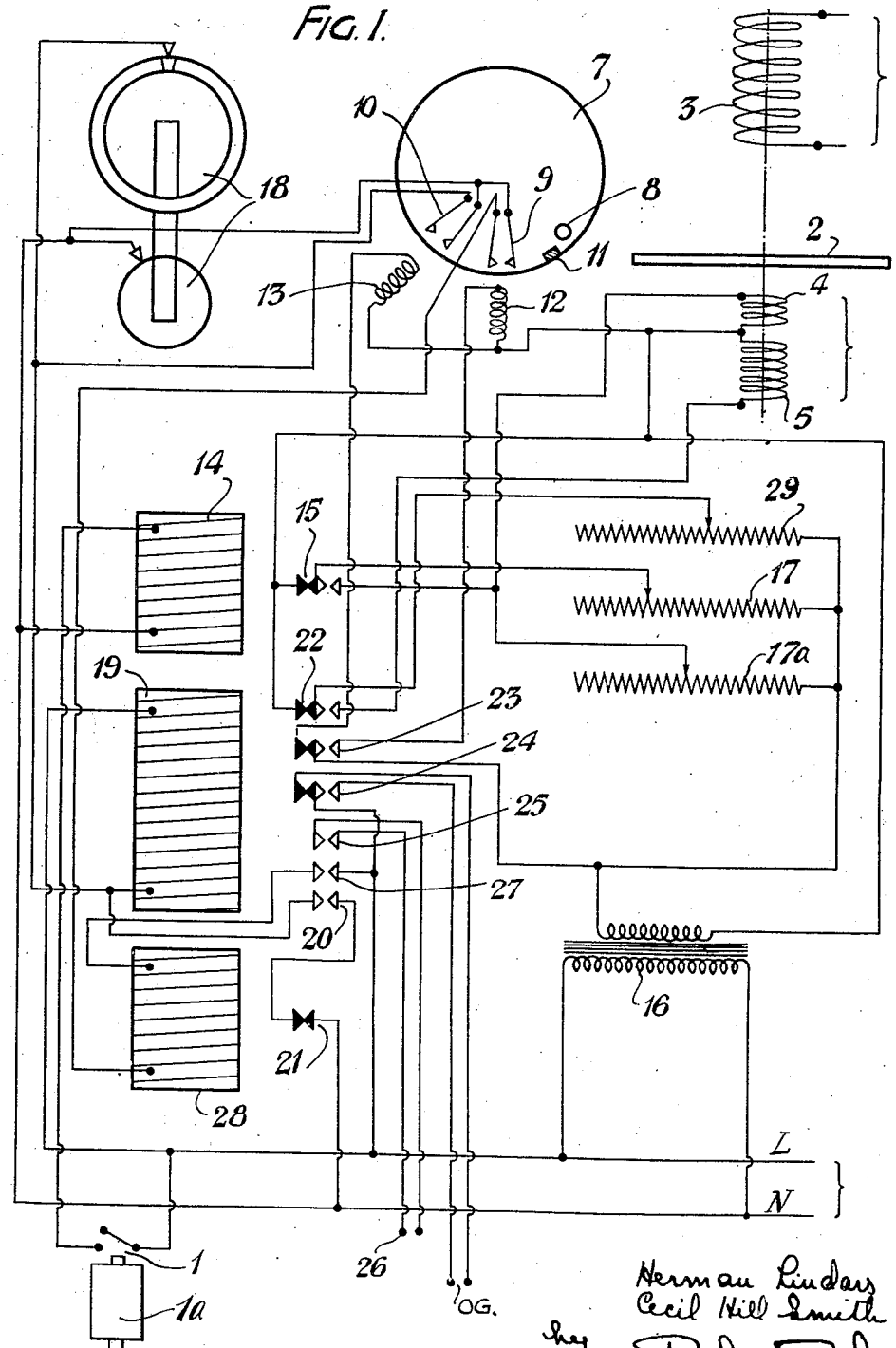
Fig. 1 shows diagrammatically the apparatus and its connections.
Figure 2:
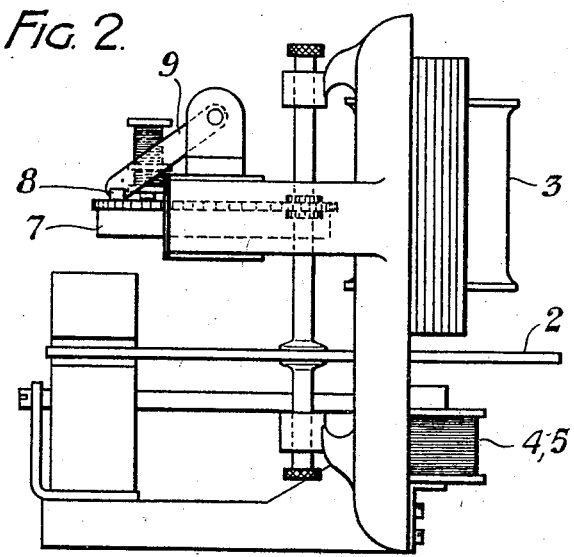
Fig. 2 shows a side view, partly diagrammatic, of the eddy current motor apparatus.
Figure 3:
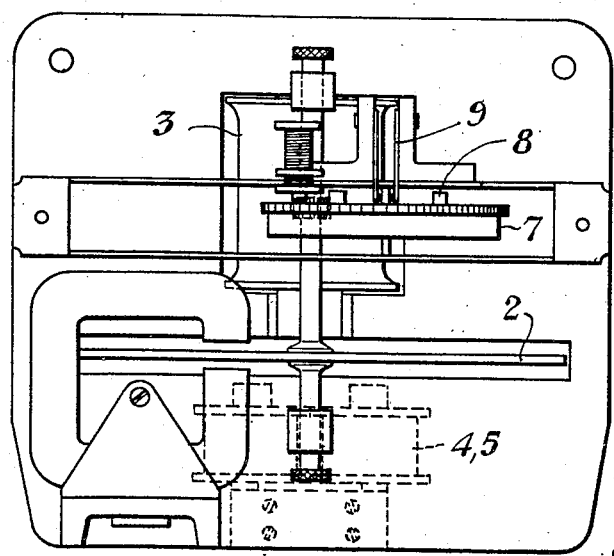
Fig. 3 shows a similar front view of said apparatus.

1 is a pair of switch contacts connected to the pole L of the supply mains L, N, and which are closed by, say, an electromagnet 1ª when the primary current flows in its energising winding. It will be well known that various forms of apparatus are known to effect this purpose and which may be considered as relays. None is therefore described because it will be so well known.

An eddy current motor of the watt-hour meter type comprises a usual disc 2 of conducting material acted upon by a voltage magnet 3 and two current magnets 4, 5, which urge it in opposite directions. This disc drives through gearing 6 a disc 7 which carries a pin 8 whose movement in one direction will close contacts 9 and whose movement in the opposite direction will close contacts 10. The disc 7 carries a magnetic armature 11 which co-operates with either an electro-magnet 12 or an electro-magnet 13 depending on the direction of rotation of the disc 7. The arrangement of this part of the apparatus is such that when the pin 8 is moving towards the contacts 9, the magnet 12 is energised and attracts the armature 11 so as to provide additional force acting to close the contacts. When the disc 7 moves in the opposite direction and the pin 8 moves towards the contacts 10 the magnet 13 is energised and the armature 11 is attracted so as to provide additional force acting to close said contacts 10. The energisation of the magnet 4 causes the disc 7 to rotate to move the pin 8 away from the contacts 9 and towards the contacts 10, and the energisation of the magnet 5 causes the disc 7 to rotate in the opposite direction to move the pin 8 towards the contacts 9. The magnets 4 and 5 are so proportioned that the magnet 5 causes the discs 2 and 7 to rotate faster than does the magnet 4.

The contacts 1 are connected in the circuit of a relay 14. The circuit of that relay will be closed for the intervals during which the contacts 1 are closed, that is, the intervals during which the primary current flows. When the relay 14 is energised it operates the front contacts of the contact set 15 so as to connect the magnet 4 in circuit with the supply transformer 16 through the variable resistance 17. The back contacts of the set 15 keep the resistance 17 in circuit with the secondary of the transformer 16 when the relay 14 is de-energised and thus maintain the load—and hence the voltage—across the secondary substantially constant during operation of the apparatus. The back contacts of the set 22 perform a similar function in respect of the resistance 29 (referred to below). The magnet 4 is then energised and the disc 7 moves the pin 8 away from the contacts 9 and towards the contacts 10.

In the arrangement shown in the drawings, the magnet 4 is permanently energised through a variable resistance 17a, which is preferably of a value high in relation to the resistance 17 and serves as a "creep adjustment" when the apparatus is used, say, in connection with fuel feed mechanism in a furnace. Its purpose is to provide for a "trickle feed" of fuel to the furnace to compensate for the inevitable in-leakage of air to the furnace which would otherwise upset the correct air/fuel ratio. In other applications of the apparatus, however, the creep adjustment resistance 17a may be omitted.

When the contacts 10 are closed by the pin 8, the relay 19 is energised and effects a number of energizing or de-energizing operations through a series of contacts. Firstly, it closes the contacts 20 and thereby produces a hold-on of the coil of the relay 19 after the switch 18 is opened, as described below. It will be noted that contacts 20 are in series with contacts 21 which at this stage are closed. Secondly it changes over the contacts 22 so as to connect the magnet 5 to the supply transformer 16 through the variable resistance 29. This causes the disc 2 and consequently the disc 7 to rotate in the opposite direction so as to move the pin 8 towards the contacts 9. If the relay 14 is still energised the speed of the discs will be the difference of speed produced by the two magnets 4, 5. Thirdly it operates the contacts 23 so as to disconnect the magnet 13 from and connect the magnet 12 to the supply transformer 16 whereby when the armature 11 moves towards said magnet an additional force will be provided to move the pin 8 to close the contacts 9. Fourthly it operates the contacts 24 which control circuits OG of indicating means such as lamps which will show when the relay 19 is energised or not and therefore when the secondary circuit is closed or not. Fifthly it operates the contacts 25 which close the secondary circuit 26 to be controlled, i. e., in which the secondary current is to flow. Sixthly it closes the contacts 27 in the circuit of a third relay 28 and the contacts 9, so that immediately the pin 8 closes the contacts 9 the relay 28 is energised and the contacts 21 which it controls are immediately opened. As these are in series with the contacts 20 the relay 19 is immediately deenergised and all the contacts which it controls open. Thus the secondary circuit is broken. The contacts 27 open and the relay 28 becomes de-energised even though the contacts 9 remain closed. A modifying control of the time ratio between the period of duration of the primary impulses and that during which the secondary circuit remains closed is provided by a clock-operated switch, designated generally at 18, which is continuously running and which may be a synchronous motor. This switch consists of a slip-ring on the motor shaft connected by a brush to the supply main N and electrically connected to a conducting segment in an insulating ring also fixed on the motor shaft. A brush bears on the insulating ring and every time the conducting segment passes under it transmits a current impulse to the relay 19, which then operates the contacts 25 to close the secondary circuit 26, without the delay attendant on the closing of the contacts 10 by the pin 8. The secondary circuit remains closed until the disc 2 has run back under the action of the magnet 5, energised by the contacts 22 of the relay 19, far enough to bring about closure of the contacts 9 by the pin 8. Should the switch 18 again close before a primary current impulse in the magnet 1a operates the relay 14 to energise the magnet 4 and drive the disc forward, the relay 19 will only be energised momentarily since the pin 8 will be resting against the contacts 9 and will be drawn round to hold them closed due to the attraction of the armature 11 by the coil 12 energised by closure of the contacts 23 of the relay 19. In a typical apparatus according to the invention the speed of rotation of the switch 18 is about 1 R. P. M.

Should the switch 18 be omitted it will be realised that only the magnet 4 will become energised at intervals and this will cause the disc 7 to rotate so as to move the pin 8 in steps until the contacts 10 are closed. The closing of the contacts 10 will effect the same purpose as the switch 18 in that the relay coil 19 will be energized and the series of energising and de-energising operations described above will take place. During these operations the secondary circuit will be closed until the pin 8 closes the contacts 9.

Thus it will be seen that the switch 18 may be dispensed with. However, this switch 18 causes the closing of the secondary circuit at regular convenient intervals. If desired the speed of the motor driving the switch 18 may be arranged to be variable, so that the modifying control to be exercised thereby may be selected according to the prevailing conditions of the process or operations regulated by the secondary circuit 26. It may be noted here that, if the contacts 1 are short-circuited, the apparatus can be used as a master time controller.

The time during which the magnet 4 is energised is the time that the primary current is flowing through the electro-magnet 1a to operate the contacts 1, whilst the time during which the magnet 5 is energised is the time that the secondary circuit is closed and is also the time that the pin 8 is moving towards the contacts 9.

In a condition therefore in which the magnet 4 is alone energised and then the magnet 5 is alone energised the time of the movement of the pin 8 towards the contacts 9 is a definite fraction of the time of movement of the pin away from said contacts. Therefore the secondary circuit is closed for this definite fraction of time that the primary current flows. The speed of the disc 2 depends on the strengths of the magnets 4, 5, that is on the current which flows in the magnetising coils of said magnets. Thus the fraction of time that the primary current flows and which is the time that the secondary circuit is closed can be controlled by varying the magnetising current of the magnets 4 and 5 by means of the variable resistances 17 and 29.

However, for part of the time both magnets 4 and 5 may be energised together. The result will be that the time during which the pin 8 moves towards the contacts 9 will be increased because the magnet 4 is tending to drive the pin in the opposite direction for a part of the time. The disc 2 has the effect of adding together the time periods during which primary current flows and the fractions of this sum during which the secondary circuit is to be closed, in conditions in which magnets 4 and 5 are energised either together or separately.

Instead of two separate magnets 4, 5 a single centre tapped coil may be employed.

The disc 7 may be replaced by an arm, as will be understood.

What we claim is:

1. An electrical timing device of the kind to receive primary electrical current impulses from a first electrical circuit which act to close a secondary electrical circuit including apparatus to be controlled, for a period of time which is a desired fraction of the duration of the primary impulses, the said timing device comprising an electric eddy-current motor of the watt-hour meter type having two current magnets which act on the movable element to urge it in opposite directions, means to cause energisation of one magnet when the primary electrical current impulses flow, means to cause energisation of the other magnet at predetermined intervals comprising contacts closed by the movable element of the motor under the action of the one magnet, means to cause de-energisation of said other magnet when the movable element of the motor has returned to a zero or starting position, and means to close the secondary circuit during the period that the movable element of the motor is returning to the zero or starting position, said other magnet causing the movable element to move at a faster rate than does the one magnet.

2. An electrical timing device of the kind to receive primary electrical current impulses from a first electrical circuit which act to close a secondary electrical circuit including apparatus to be controlled, for a period of time which is a desired fraction of the duration of the primary impulses, the said timing device comprising an electric eddy-current motor of the watt-hour meter type having two current magnets which act on the movable element to urge it in opposite directions, a relay which is energised when the primary electrical current impulses flow, contacts connected in the circuit of one magnet and controlled by the relay, means to cause energisation of the other magnet at predetermined intervals comprising contacts closed by the movable element of the motor under the action of the one magnet, means to cause de-energisation of said other magnet when the movable element of the motor has returned to a zero or starting position, and means to close the secondary circuit during the period that the movable element of the motor is returning to the zero or starting position, said other magnet causing the movable element to move at a faster rate than does the one magnet.

3. An electrical timing device of the kind to receive primary electrical current impulses from a first electrical circuit which act to close a secondary electrical circuit including apparatus to be controlled, for a period of time which is a desired fraction of the duration of the primary impulses, the said timing device comprising an electric eddy-current motor of the watt-hour meter type having two current magnets which act on the movable element to urge it in opposite directions, a first relay to cause energisation of one magnet when the primary electrical current impulses flow, means to cause energisation of the other magnet at predetermined intervals comprising a second relay, contacts in the circuit of the second relay, closed by the movable element of the motor under the action of the one magnet, contacts controlled by the second relay and in the circuit of the other magnet, means to cause de-energisation of said other magnet when the movable element of the motor has returned to a zero or starting position, and means to close the secondary circuit during the period that the movable element of the motor is returning to the zero or starting position, said other magnet causing the movable element to move at a faster rate than does the one magnet.

4. An electrical timing device of the kind to receive primary electrical current impulses from a first electrical circuit which act to close a secondary electrical circuit including apparatus to be controlled, for a period of time which is a desired fraction of the duration of the primary impulses, the said timing device comprising an electric eddy-current motor of the watt-hour meter type having two current magnets which act on the movable element to urge it in opposite directions, a first relay which is energised when the primary electrical current impulses flow, contacts connected in the circuit of one magnet and controlled by the first relay, means to cause energisation of the other magnet at predetermined intervals comprising a second relay, contacts in the circuit of the second relay closed by the movable element of the motor under the action of the one magnet, contacts controlled by the second relay and in the circuit of the other magnet, means to cause de-energisation of said other magnet when the movable element of the motor has returned to a zero or starting position, and means to close the secondary circuit during the period that the movable element of the motor is returning to the zero or starting position, said other magnet causing the movable element to move at a faster rate than does the one magnet.

5. An electrical timing device of the kind to receive primary electrical current impulses from a first electrical circuit which act to close a secondary electrical circuit including apparatus to be controlled, for a period of time which is a desired fraction of the duration of the primary impulses, the said timing device comprising an electric eddy-current motor of the watt-hour meter type having two current magnets which act on the movable element to urge it in opposite directions, a first relay which is energised when the primary electrical current impulses flow, contacts connected in the circuit of one magnet and controlled by the first relay, means to cause energisation of the other magnet at predetermined intervals comprising a second relay, contacts in the circuit of the second relay closed by the movable element of the motor under the action of the one magnet, contacts controlled by the second relay and in the circuit of the other magnet, contacts in the circuit of the second relay, a third relay to open said contacts, contacts in the circuit of the third relay which are closed by the movable element of the motor when it returns to its zero or starting position, and means to close the secondary circuit during the period that the movable element of the motor is returning to the zero or starting position, said other magnet causing the movable element to move at a faster rate than does the one magnet.

6. An electrical timing device of the kind to receive primary electrical current impulses from a first electrical circuit which act to close a secondary electrical circuit including apparatus to be controlled, for a period of time which is a desired fraction of the duration of the primary impulses according to claim 5 wherein the means to close the secondary circuit comprises contacts controlled by the second relay.

7. An electrical timing device of the kind to receive primary electrical current impulses from a first electrical circuit which act to close a secondary electrical circuit including apparatus to be controlled, for a period of time which is a desired fraction of the duration of the primary impulses, the said timing device comprising an electric eddy-current motor of the watt-hour meter type having two current magnets which act on the movable element to urge it in opposite directions, a variable resistance in the circuit of each of the current magnets, a first relay which is energised when the primary electrical current impulses flow, contacts connected in the circuit of one magnet and controlled by the first relay, means to cause energisation of the other magnet at predetermined intervals comprising a second relay, contacts in the circuit of the second relay closed by the movable element of the motor under the action of the one magnet, contacts controlled by the second relay and in the circuit of the other magnet, contacts in the circuit of the second relay, a third relay to open said contacts, contacts in the circuit of the third relay which are closed by the movable element of the motor when it returns to its zero or starting position, and means to close the secondary circuit during the period that the movable element of the motor is returning to the zero or starting position, said other magnet causing the movable element to move at a faster rate than does the one magnet.

8. Apparatus according to claim 1 wherein the one magnet is directly connected to supply terminals through a resistance.

9. Apparatus according to claim 1 wherein the other magnet is directly connected to supply terminals through a resistance.

10. An electrical timing device of the kind to receive primary electrical current impulses from a first electrical circuit which act to close a secondary electrical circuit including apparatus to be controlled for a period of time which is a desired fraction of the duration of the primary impulses, the said timing device comprising an electric eddy-current motor of the watt-hour meter type having two current magnets which act on the movable element to urge it in opposite directions, means to cause energisation of one magnet when the primary electrical current impulses flow, means to cause energisation of the other magnet at predetermined intervals comprising time-switch mechanism and contacts closed by the movable element of the motor under the action of the one magnet, means to cause deenergisation of said other magnet when the movable element of the motor has returned to a zero or starting position, and means to close the secondary circuit during the period that the movable element of the motor is returning to the zero or starting position, said other magnet causing the movable element to move at a faster rate than does the one magnet.

11. An electrical timing device of the kind to receive primary electrical current impulses from a first electrical circuit which act to close a secondary electrical circuit including apparatus to be controlled, for a period of time which is a desired fraction of the duration of the primary impulses, the said timing device comprising an electric eddy-current motor of the watt-hour meter type having two current magnets which act on the movable element to urge it in opposite directions, a first relay which is energised when the primary electrical current impulses flow, contacts connected in the circuit of one magnet and controlled by the first relay, means to cause energisation of the other magnet at predetermined intervals, comprising time switch mechanism, a second relay, contacts in the circuit of the second relay closed by the movable element of the motor under the action of the one magnet, other contacts in the circuit of the second relay in parallel with the first contacts and closed by the time switch mechanism, contacts controlled by the second relay and in the circuit of the other magnet, means to cause de-energisation of said other magnet when the movable element of the motor has returned to a zero or starting position, and means to close the secondary circuit during the period that the movable element of the motor is returning to the zero or starting position, said other magnet causing the movable element to move at a faster rate than does the one magnet.

12. An electrical timing device of the kind to receive primary electrical current impulses from a first electrical circuit which act to close a secondary electrical circuit including apparatus to be controlled, for a period of time which is a desired fraction of the duration of the primary impulses, the said timing device comprising an electric eddy-current motor of the watt-hour meter type having two current magnets which act on the movable element to urge it in opposite directions, a first relay which is energised when the primary electrical current impulses flow, contacts connected in the circuit of one magnet and controlled by the first relay, means to cause energisation of the other magnet at predetermined intervals, comprising time-switch mechanism, a second relay, contacts in the circuit of the second relay closed by the movable element of the motor under the action of the one magnet, other contacts in the circuit of the second relay in parallel with the first contacts and closed by the time-switch mechanism, contacts controlled by the second relay and in the circuit of the other magnet, contacts in the circuit of the second relay, a third relay to open said contacts, contacts in the circuit of the third relay which are closed by the movable element of the motor when it returns to its zero or starting position, and means to close the secondary circuit during the period that the movable element of the motor is returning to the zero or starting position, said other magnet causing the movable element to move at a faster rate than does the one magnet.

CECIL HILL SMITH.
HERMAN LINDARS.